United States Patent [19]
Takeuchi et al.

[11] Patent Number: 4,738,736
[45] Date of Patent: Apr. 19, 1988

[54] METHOD FOR MOLDING A BELT FOR TRANSMITTING POWER

[75] Inventors: Koichi Takeuchi, Sennan; Megumi Yamanaka, Osaka; Masayoshi Kubo, Akunoura; Hideaki Katayama; Kenji Tokunaga, both of Nagasaki, all of Japan

[73] Assignees: Mitsubishi Jukogyo Kabushiki Kaisha, Tokoyo; Bando Chemical Industries, Ltd., Hyogo, both of Japan

[21] Appl. No.: 870,745

[22] Filed: Jun. 4, 1986

Related U.S. Application Data

[62] Division of Ser. No. 759,735, Jul. 29, 1985.

[51] Int. Cl.$^4$ ............................................. B65H 81/00
[52] U.S. Cl. ..................................... 156/64; 156/137; 156/350
[58] Field of Search ............... 156/169, 137, 425, 172, 156/173, 64, 350

[56] References Cited

U.S. PATENT DOCUMENTS 4,024,006  5/1977  Gray ................................... 156/425
4,062,717  12/1977  McClean ............................ 156/425

FOREIGN PATENT DOCUMENTS 2423914  4/1975  Fed. Rep. of Germany.

Primary Examiner—Michael Ball
Attorney, Agent, or Firm—Birch, Stewart, Kolasch & Birch

[57] ABSTRACT

A method of and an apparatus for molding a belt for transmitting power, comprise mounting a cylindrical unvulcanized rubber sheet on a mandrel, selecting a necessary mandrel of a plurality of mandrels on which unvulcanized rubber sheets are mounted, moving the mandrel to a cord layer forming unit, winding a cord on the cylindrical unvulcanized rubber sheet mounted on the mandrel, moving the cord wound mandrel to a laminated body forming and cutting unit, winding an unvulcanized rubber sheet on the cord wound mandrel to form a laminated body, cutting the laminated body, moving the cut laminated body to an unvulcanized rubber sheet mounting unit, and taking out the belt.

2 Claims, 9 Drawing Sheets

METHOD FOR MOLDING A BELT FOR TRANSMITTING POWER

This application is a divisional of co-pending application Ser. No. 759,735, filed July 29, 1985.

The present invention relates to a method of and an apparatus for molding a belt for transmitting power.

There are various types of power transmitting belts such as a V belt, a flat belt, a toothed belt and the like. Further, taking up the V belt, for example, the V belt is divided into various types on the basis of a cross-section size such as A type and B type, a peripheral length size and a material such as a standard type and a oil-resistive type. The types of the belts are the multiplication of the various types. However, the production for each belt is relatively small and the belt is a typical product which has various types but less production.

Generally, the V belt is constructed in such a manner that a first unvulcanized rubber sheet, a padding cord, a second unvulcanized rubber sheet and a third unvulcanized rubber sheet are wound on a mandrel through a sleeve in the order described above to form a cylindrical laminated body and the laminated body is cut perpendicularly to the axis of the mandrel to form a predetermined shaped unvulcanized V belt. However, in a molding method of the prior art, much handwork of workers is required, and hence the molding time can not be shortened and the productivity can not be improved.

The molding operation of the conventional cylindrical laminated body described above is performed on the mandrel with sleeve coupled with a headstock and a tailstock or on a mandrel having a peripheral length capable of extending and contracting in a certain range. In other words, in the conventional molding apparatus of the belt, the whole molding process thereof is made on a mandrel having a cylindrical outer periphery fixed by bolts on a rotaing main spindle. Therefore, when a condition different for each belt is set or a peripheral length of a belt is changed, much time and labor are required to exchange the mandrel and change the setting condition of the stroke of a movable portion, the rotational number and the like due to the exchange of the mandrel. Accordingly, the actual working ratio of manufacturing facilities is low. In order to increase the actual working ratio as much as possible, if belts of the type that can be molded on the same mandrel under the same setting condition are collected to be molded continuously, it is required to prepare many metallic molds for vulcanization and many incomplete products in processes are produced. More specifically, a large working space is required and a production lot for each type of the belt must be large.

Further, operations other than the exchange of the mandrel, for example the winding operation of the unvulcanized rubber sheet in the molding process is made by handwork of workers. Accordingly, it is difficult to align the beginning end and the termination end of the wound rubber sheet and there are differences in the alignment depending on workers, thereby degrading the quality of the belts due to the scattering of the overlapped portion.

In the conventional molding operation of the belts, operators determine the material and condition suitable for each type. Therefore, there is a high possibility that the wrong material is used and the setting of the condition is wrong.

The present invention has been made in view of the above drawbacks and an object of the present invention is to provide a method of and an apparatus for molding a belt for transmitting power, in which a process of molding a belt padding is divided into three steps each step being carried out at a different place at the same time, the exchange of a mandrel due to the change of a peripheral length is executed automatically and parallelly at the same time as the molding work, and feeding material is automatically selected and used in accordance with a predetermined program.

A first invention resides in a method of molding a belt for transmitting power, characterized by the provision of a step of mounting a cylindrical unvulcanized rubber sheet on a mandrel, a step of selecting a necessary mandrel of a plurality of mandrels on which unvulcanized rubber sheets are mounted, a step of moving the the mandrel to a cord layer forming unit, a step of winding a cord on the cylindrical unvulcanized rubber sheet mounted on the madrel, a step of moving the cord wound mandrel to a laminated body forming and cutting unit, a step of winding an unvulcanized rubber sheet on the cord wound mandrel to form a laminated body, a step of cutting the laminated body, a step of moving the cut laminated body to an unvulcanized rubber sheet mounting unit and taking out the belt.

A second invention resides in an apparatus for molding a belt for transmitting power, characterized by the provision of a first unit for winding a cord on an outer peripheral surface of a cylindrical unvulcanized rubber sheet mounted on a mandrel through a sleeve to form a cord layer, a second unit for winding an unvulcanized rubber sheet on an outer peripheral surface of the cord layer to form a cylindrical laminated body, the laminated body being cut perpendicularly to an axis of the mandrel to form a plurality of unvulcanized belt paddings having a predetermined shape, a third unit for mounting a subsequently used unvulcanized rubber sheet together with a sleeve after taking out the plurality of unvulcanized belt paddings alone or together with the sleeve from the mandrel, a unit for transporting the unvulcanized belt paddings in the course of molding process or which have been molded, together with the mandrel between the first and second units, the second and third units and the third and first units, a cord feeding unit for feeding a cord to the first unit, a unit for feeding the unvulcanized rubber sheet to the second unit and a controller for controlling the units.

The features and advantages of the present invention will now be described with reference to drawings showing preferred embodiments of the present invention, in which.

Figure 1:
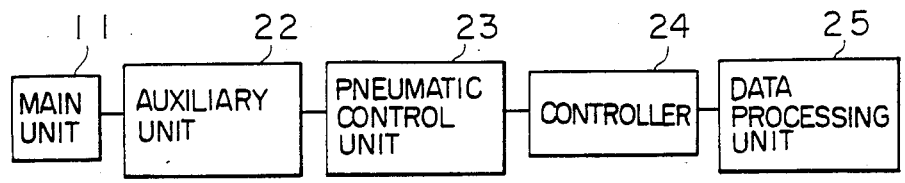
FIG. 1 is a block diagram of a V belt molding apparatus according to the present invention.

Referring to FIG. 1, a V belt molding apparatus in accordance with a preferred embodiment of the present invention comprises a main unit 11, an auxiliary unit 22 which assists the main unit 11, a pneumatic control unit 23 including a solenoid operated valve for controlling an air cylinder and an air brake which drive a portion of the main unit, a controller 24 for controlling the pneumatic control unit and a data processing unit 25 for setting the operation conditions, for example a movement quantity and a rotational number of the main unit 11.

Figure 2:
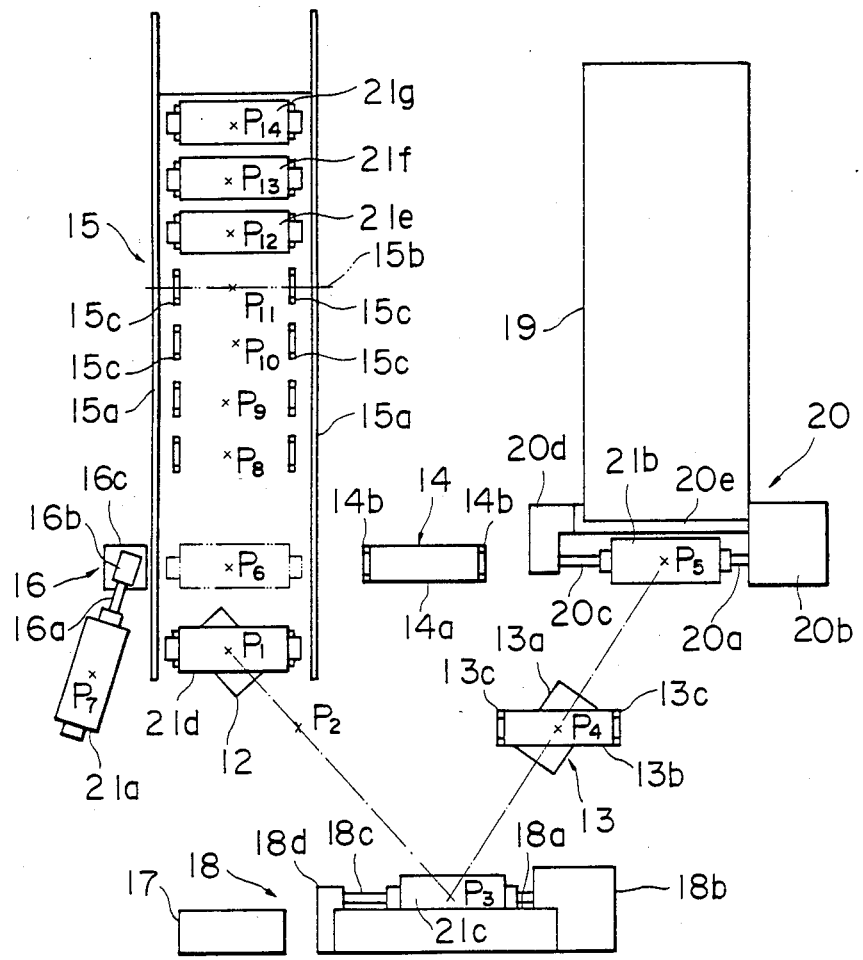
FIG. 2 is a plan view schematically illustrating a belt molding apparatus of a preferred embodiment of the present invention.

Referring to FIG. 2, the main unit 11 comprises a plurality of mandrels 21a–21g, a mandrel rack 15 which keep a plurality of mandrels on which cylindrical unvulcanized rubber sheets have been mounted or not mounted, a first unit 18 for forming a cord layer on the rubber sheet, a cord feeding unit 17 for feeding a cord to the first unit, a ply servicer 19 for feeding an unvulcanized rubber sheet on a cord layer to form a laminated body, a second unit 20 for cutting the laminated body A to form a plurality of V belt paddings B, a third unit 16 for mounting a subsequently used cylindrical unvulcanized rubber sheet on the mandrel after taking out the V belt paddings B from the mandrel, a first transportation unit 12 for transporting the mandrel (21e–21g in FIG. 2) on which the unvulcanized rubber sheet is mounted from an outlet (position P1) of the mandrel rack 15 to the first unit 18 (position P3), a second transportation unit 13 for transporting the mandrel on which the cord is wound from the first unit 18 to the second unit 20, and a third transportation unit 14 for transporting from the second unit 20 to the third unit 16 the mandrel (21b in FIG. 2) on which the V belt padding B is mounted.

The mandrel rack keeps a plurality of mandrels having various peripheral length and supporters provided at both ends thereof.

The mandrel rack 15 includes a pair of rails 15a attached on a base, a running loader 15b which moves on the rails 15a and a plurality of pairs of mandrel supporters 15c. The running loader 15b includes hooks which grasp both ends of the mandrel, means for lifting up and down the hooks, means for moving the loader, a limit switch for detecting a position and a proximity switch, while not shown. A ring with a groove which designates a mandrel number is attached on an end of the mandrel. The mandrel number is read out by a multiple switch mounted on a hook attached portion of the loader 15b when the switch is engaged with the ring.

The first unit 18 includes a main spindle 18a which supports an end of the mandrel and rotates the mandrel, a headstock 18b which rotates the main spindle 18a, a tailstock 18d which supports a tail spindle 18c and includes various limit switches and an air cylinder which moves the tail spindle 18c to a position in which the tail spindle does not affect the mandrel when the mandrel is transported to the position P3, and cord winding means including a drive device which guides a cord and causes the cord to be brought into close contact with the unvulcanized rubber sheet. The first unit 18 winds a cord 2 on the outer peripheral surface of a cylindrical unvulcanized rubber sheet 1 which is formed by disposing one type or a plurality of types of unvulcanized rubber sheets not including or including cloth or short fibers (hereinafter simply referred to as unvulcanized rubber sheet) on an outer surface of a cylindrical rubber sleeve 5 disposed on the outer peripheral surface of the mandrel 6 to form a laminated sheet containing of a single layer or a plurality of layers, thereby forming a cord layer.

The cord feeding unit 17, while not shown, includes a reel stand which rotatably holds a cord reel on which the cord 2 that is an adhesion-treated cord is wound, tension means for giving a predetermined tension to the cord 2 and a pulse generator for detecting a feeding quantity of the cord 2. Thus, the unit 17 feeds the cord 2 to the first unit 18 while maintaining the tension of the cord 2 to a predetermined value.

The ply servicer 19 includes a stand for receiving a stock roll on which the unvulcanized ruber sheet is wound together with cloth, drive means for feeding out the rubber sheet from the stock roll, an electromagnetic clutch, a brake, a photoelectric switch for detecting an end of the rubber sheet and a condition of festoon, a pulse generator for detecting a feeding quantity of the rubber sheer and cutting means for automatically cutting a remaining rubber sheet after winding the rubber sheet on the mandrel 21b. Thus, the ply servicer 19 holds the stock roll on which the rubber sheet is wound together with cloth and feeds out the rubber sheet if necessary.

The second unit 20 includes a main spindle 20a, a headstock 20b, a tail spindle 20c, a tailstock 20d and a device 20e for cutting the cylindrical laminated body A, and forms an unvulcanized V belt padding B.

The third unit 16 includes a spindle 16a for supporting the mandrel, a bracket 16b for holding the spindle 16a, a base 16c which rotatably supports the mandrel, angular movement means and a position detection limit switch not shown.

The second tranportation unit 13 includes a truck 13a which moves on rails not shown, a movable base 13b mounted on the truck 13a slidably in the axial direction, a pair of mandrel supporters 13c mounted at both ends of the movable base 13b so that the supporters can be lifted up and down, drive means, a position detection limit switch and a proximity switch not shown. The first transportation unit 12 has a same construction as the second transportation unit 13. The third transpotation unit 14 has a same construction as the second transportation unit 13 except that a pair of mandrel supporters 14b are mounted on both ends of a truck 14a. In FIG. 2, P1–P14 represent positions of the mandrel.

The control unit for controlling the main unit 11 will be described with reference to FIG. 3.

The auxiliary unit 22 comprises various drive devices 51 and various detection devices 52, which contain an air cylinder, an electric motor, an electomagnetic clutch, and a limit switch, a proximity switch and a pulse generator for detecting operational conditions of each device.

The control unit 24 comprises an operation unit 61 including a change-over switch for switching the automatic operation and the manual operation, a push-button switch for start and stop and an indication means for indicating the operation condition, a sequence circuit 62 for sequentially operating the main unit 11, and a control device 63 for the drive device including a contactor, a comparison circuit, a frequency divider and a thyristor leonard means for a DC motor.

The data processing unit 25 comprises a central processing unit 71 (hereinafter referred to as CPU) for executing the data processing in accordance with a previously inputted program, a full keyboard 72 for inputtig the specification and conditions of the V belt padding B such as a designation data for designating a sequence of molding of the V belt padding B, the number of the used cord and a winding pitch, a cathode ray tube display unit 73 (hereinafter referred to as a CRT display unit) for confirming the inputted data, a CRT interface 74 for transmitting and receiving signals between the full keyboard 72 and the CRT display unit 73 and the CPU 71, a numerical keyboard 75 for inputting the grade number of the same kind of material for the V belt padding B and the supply quantity thereof, a light emitting diode type display unit 76 (hereinafter simply referred to as LED) for displaying the grade number and the residual quantity of the material supplied to each unit, a light emitting diode type display interface 77 for transmitting and receiving signals between the numerical keyboard 75, the LED 76 and the CPU 71, an external memory read-out unit 78 for reading out designation data from an external memory such as a cassette tape or a floppy disk previously storing the designation data, a read-out unit interface 79 for transmitting and receiving signals between the external memory read-out unit 78 and the CPU 71, a memory circuit 80 containing a read only memory (ROM) and a random access memory (RAM) storing the designation data, a printer 81 for recording a working condition of the main unit 11, a printer interface 82 for operating the printer, and an input/output interface 83 for transmitting and receiving signals between the CPU 71 and the sequence circuit 62 and the control device 63 in the control unit 24 and a portion of the detection unit 52 in the auxiliary unit 22.

The V belt padding is formed in the V belt molding apparatus in accordance with the following processes.

(a) In the third unit 16, the cylindrical unvulcanized rubber sheet is mounted on the mandrel through the sleeve.

(b) The mandrel with the cylindrical unvulcanized rubber sheet 1 mounted thereon is kept on the mandrel rack 15.

(c) A necessary mandrel is selected.

(d) The selected mandrel is moved to the first unit 18.

(e) A cord layer 2 is formed on the cylindrical unvulcanized rubber sheet 1 using the first unit 18.

(f) The mandrel with the cord layer formed thereon is moved to the second unit 20.

(g) Using the ply servicer 19, the cord layer 2 is covered with unvulcanized rubber sheets 3 and 4 to form a laminated body A.

(h) The laminated body A is cut to form a V belt padding B.

(i) The mandrel is moved to the third unit 16 together with the V belt padding B.

(j) Using the third unit 16, the V belt padding B is removed from the mandrel.

(k) The process is returned to the step (a).

FIGS. 4 to 9 show sectional views and side views partly cut away of the V belt padding, the mandrel kept on the mandrel rack, the mandrel with the cord layer 2 formed thereon by the first unit 18, the mandrel with the laminated body A formed thereon in the ply servicer 19, the mandrel with the plurality of V belt paddings B cut by the second unit 20 and the mandrel in which the V belt padding B has been removed in the third unit 16.

The main unit shown in FIG. 2 operates as follows.

When a start button is pressed, the running loader 15b moves to a position Pn where a corresponding mandrel M is kept and the grasp portions fall to hold a predetermined mandrel. When the first transportation unit 12 which lifts up the mandrel and moves to the position P1 is in a state capable of receiving the mandrel, the running loader 15b falls to put the mandrel on the first transportation unit 12 and the grasp portions is then raised. When the grasp portions have been raised completely, the transportation unit 12 moves from the position P1 to the position P3. When the the tail portion 18d of the first unit 18 moves to support the mandrel, the transportation unit 12 is returned to the position P1 to receive a next mandrel. However, when the first unit 18 is not in a condition where it can be received the mandrel, the first unit 18 waits at the position P2 temporarily.

A predetermined cord is wound on the mandrel with sleeve having the unvulcanized rubber sheet mounted thereon at a predetermined winding pitch Qp over a predetermined width Qw at a designated winding speed. At this time, the ends of the cord at the beginning and the termination thereof are automatically treated.

The truck 13a of the transportation unit 13 is moved to the position P3 at the same time when the cord has been wound completely. When the movable base 13b of the truck 13a supports the mandrel, the tail spindle 18c is moved to the rear side and the tail portion 18d is returned to the waiting position. The truck 13a transports the mandrel on which the cord has been wound completely from the position P3 to the position P5. When the second unit 20 is not in the condition where it can be received the mandrel, the truck 13a waits at the position P4 temporarily.

When the truck 13a mounts the mandrel onto the main spindle 20a at the position P5 completely, the tail portion 20d is moved and the tail spindle 20c is engaged with the mandrel to support the mandrel. When the mandrel is supported, the truck 13a releases the mandrel and is ruturned to the position P4.

When the mandrel begins to rotate, the outer peripheral length of the cord layer wound on the mandrel is measured by a peripheral length measuring instrument attached to the headstock 20b of the second unit 20. The next selected material is fed from the servicer 19. A predetermined length of unvulcanized rubber sheet is fed out from the servicer 19 and is wound on the mandrel 21 by the desired number of layers. Then, the unvulcanized rubber sheet is automatically cut by an equipped cutter.

Figure 8:
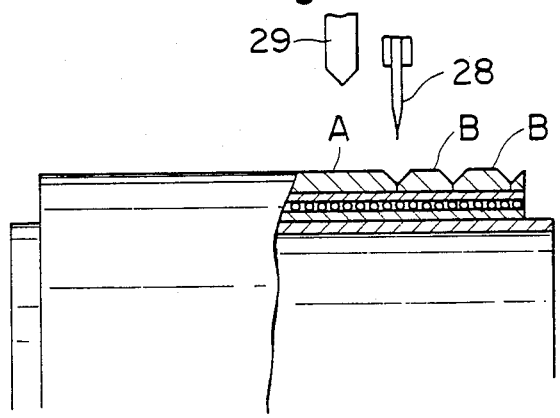
Figure 9:
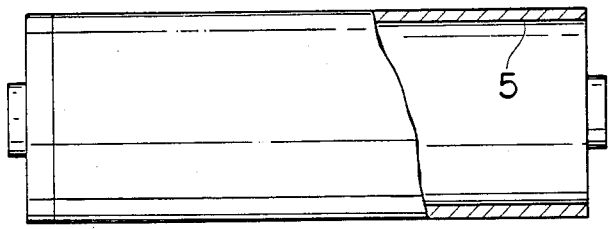

Thereafter, the cutter device 20e equipped with the cutting edge 28 and the skiving edge 29 of FIG. 8 is moved in the parallel direction and the perpendicular direction to the axis of the mandrel. The laminated body A is then cut to a predetermined shape sequentially to obtain the predetermined number Z of V belt paddings B.

When the cutting operation is finished, the cutter device 21e is moved back toward the servicer 19 to return to the original position and at the same time the mandrel is stopped. When the truck 14a of the third transportation unit 14 is moved to the position P5 to support the mandrel, the tail spindle 20c is moved out and the tail portion 20d is returned to the waiting position. The truck 14a is moved to the position P6 while supporting the mandrel, and is stopped there.

When a start button of the third unit 16 is pressed, the mandrel is locked to the spindle 16a by a clamp device not shown and the mandrel supporters 14b of the transportation unit 14 is then dropped. The first transportation unit 12 is stopped at the positions P2 and P3.

The operator takes out the V belt padding from the mandrel and then mounts a subsequently used cylindrical unvulcanized rubber sheet. When the start button is then pressed, the mandrel is moved angularly from the position P7 to the position P6 and stopped.

When the spindle 16a is moved angularly and the mandrel reaches the position P6, the truck 14a of the transportation unit 14 at the position P6 lifts up the mandrel supporters 14b again to support the mandrel once. When the supporting operation is finished, the above lock operation in the third unit 16 is released. The running loader 15b is then moved down to the position P6 to hold the mandrel. After the mandrel is lifted up, the loader 15b is moved to keep the mandrel to the empty portion. In FIG. 2, if the number of the mandrels in the system is equal to or more than four (or five when the transportation unit 14 can be stopped once at the position shown in figure), the mandrel rack can be omitted by moving the stop position P1 of the transportation unit 12 to the position P6.

The main unit 11 is controlled by the control unit shown in FIG. 3 as follows.

(1) The full keyboard 72 of the data processing unit 25 is used to previously input the data such as the type number V for each V belt padding, the molding peripheral length Lm, the material number Qn of the used cord and the unvulcanized rubber sheet corresponding to the grade section number Q, the number Ql of winding layers of each unvulcanized rubber sheet, the winding pitch Qp of the cord, the winding width Qw of the cord, the cut width W, the number Z of the obtained V belt paddings and the volume Qv per unit length of the V belt padding for all types of V belt paddings to be molded. When the cord and the rubber sheet are fed, the feeding position number Pn, the fed material number Qn and the length Ln of the fed material are inputted by the numerical keyboard 75 and these data are stored in the memory circuit 80.

Then, before starting the molding operation, the data concerning the molding number N, the type number V of the V belt corresponding to the molding number, the peripheral length Lm of the molding, the grade use section Q and the used mandrel number M are inputted using the full keyboard 72 of the data processing unit 25 or the external memory read-out unit 78 and stored in the memory circuit 80.

(2) When the change-over switch of the operation unit 61 of the control unit 24 is set to the automatic side and the start switch is pressed, the automatic molding operation is started. However, before starting of the molding operation, the mandrel is set with a predetermined sleeve 5 mounted. The number M of the mandrel is automatically read by multiple switch of the loader 15b and stored in the memory circuit 80 together with the set position Pn. Thereafter, by pressing the start button, the data request signal is supplied to the CPU 71 through the sequence circuit 62 of the control unit 24 and the input/output interface 83 of the data processing unit 25. When the content of No. 1 counter memory of the memory circuit 80 is N, the mandrel number M and the mandrel position Pn corresponding to the molding number N are selected and supplied to the sequence circuit 62 through the input/output interface 83. The loader 15b is moved to the position Pn where the corresponding mandrel M is kept in accordance with the sequence incorporated in the sequence circuit 62 and the grasp portions are dropped to hold a predetermined mandrel. The mandrel number is read out by the multiple switch mounted in the grasp attachment portion. If the number is equal to the designated number, the mandrel is lifted up.

(3) When the first unit 18 supports the mandrel completely, the sequence circuit 62 produces the data request singal to the CPU 71. The CPU 71 selects the Nth data such as the cord number Qn, the winding pitch Qp, the cord winding width Qw and the molding peripheral length Lm. The selected data are supplied from the memory circuit 80 through the input/output interface 83 to the sequence circuit 62 and the control unit 63.

A predetermined cord is wound on the mandrel 21c with the sleeve on which the unvulcanized rubber sheet is mounted at a predetermined winding pitch Qp over a predetermined cord winding width Qw at a predetermined speed.

(4) When the cord has been wound completely, the completion signal is supplied to the CPU 71 and the counter memory is incremented by +1. At the same time, the truck 13a of the transportation unit 13 is moved to the position P3.

When the truck 13a mounts the mandrel onto the main spindle 20a at the position P5 completely, the sequence circuit 62 produces the data request signal to the CPU 71 through the input/output interface 83. The tail portion 20d is moved to support the mandrel and tail spindle 20c is engaged with the mandrel.

At this time, if the counter memory of the memory circuit 80 is N, the data corresponding to the molding number N is selected and the material number Qn and the winding layer number Ql of the unvulcanized rubber sheet, the cut width W, the obtained number Z and the unit volume Qw of the unvulcanized rubber sheet are selected.

(5) When the mandrel begins to rotate, the outer peripheral length of the cord layer wound on the mandrel is measured by the peripheral length measuring instrument attached to the headstock 20b of the second unit 20 and the measured data is supplied to the CPU 71 through the input/output interface 83. Next, the selected material is fed out by the servicer 19. The length of the cord fed out at this time is used to be calculated in the CPU 71 together with the data of the previously measured cord layer outer peripheral length and the previously inputted mechanical data.

(6) The cutter device 20e equipped with the cutting edge 28 and the skiving edge 29 of FIG. 8 is moved in the parallel direction and the perpendicular direction to the axis of the mandrel and then begins to cut to a predetermined shape sequentially on the basis of the data processed in the CPU 71 and the signal supplied to the sequence circuit 62 through the input/output interface 83 to obtain a predetermined number Z of V belt paddings B.

(7) When the cutting operation is finished, the sequence circuit 62 supplys an end signal to the CPU 71 through the interface 83 and the memory counter is incremented by +1.

(8) After the V belt paddings are taken out from the mandrel, the subsequently used cylindrical unvulcanized rubber sheet is mounted. When the start button is then pressed, the mandrel is angularly moved from the position P7 to the position P6 and stopped there. At this time, the data request signal is supplied from the sequence circuit 62 through the interface 83 to the CPU 71. When the memory counter of the memory circuit 80 is N, the mandrel number M corresponding to the molding number N is selected in accordance with the stored designation data. An empty mandrel receiving position is searched for the mandrel receiving position P8–P14 and the information of the searched position is supplied to the sequence circuit 62.

(9) When the loader 15b is moved down to the position P6 and holds the mandrel, the mandrel number is read out by the multiple switch attached to the grasp portion. If the read mandrel number is identical with the mandrel number produced from the data processing unit 25, the mandrel is lifted up and the loader 15b is moved to set the mandrel to the searched empty position.

While the above description has been made to the molding of the wrapped V belt padding by the reverse molding method, it is applicable to the regular molding method and it is also applicable to the molding of a low-edge type, a timing belt, a poly V belt and a flat belt.

Figure 10:
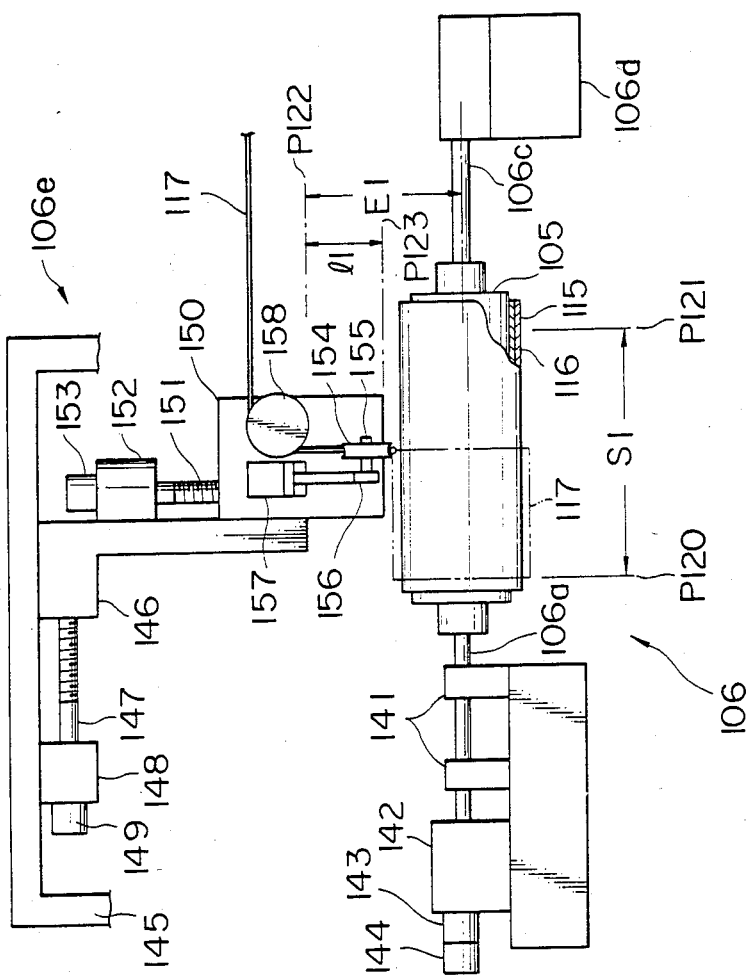
FIG. 10 is a front view schematically illustrating an improvement of a first unit.
Figure 11:
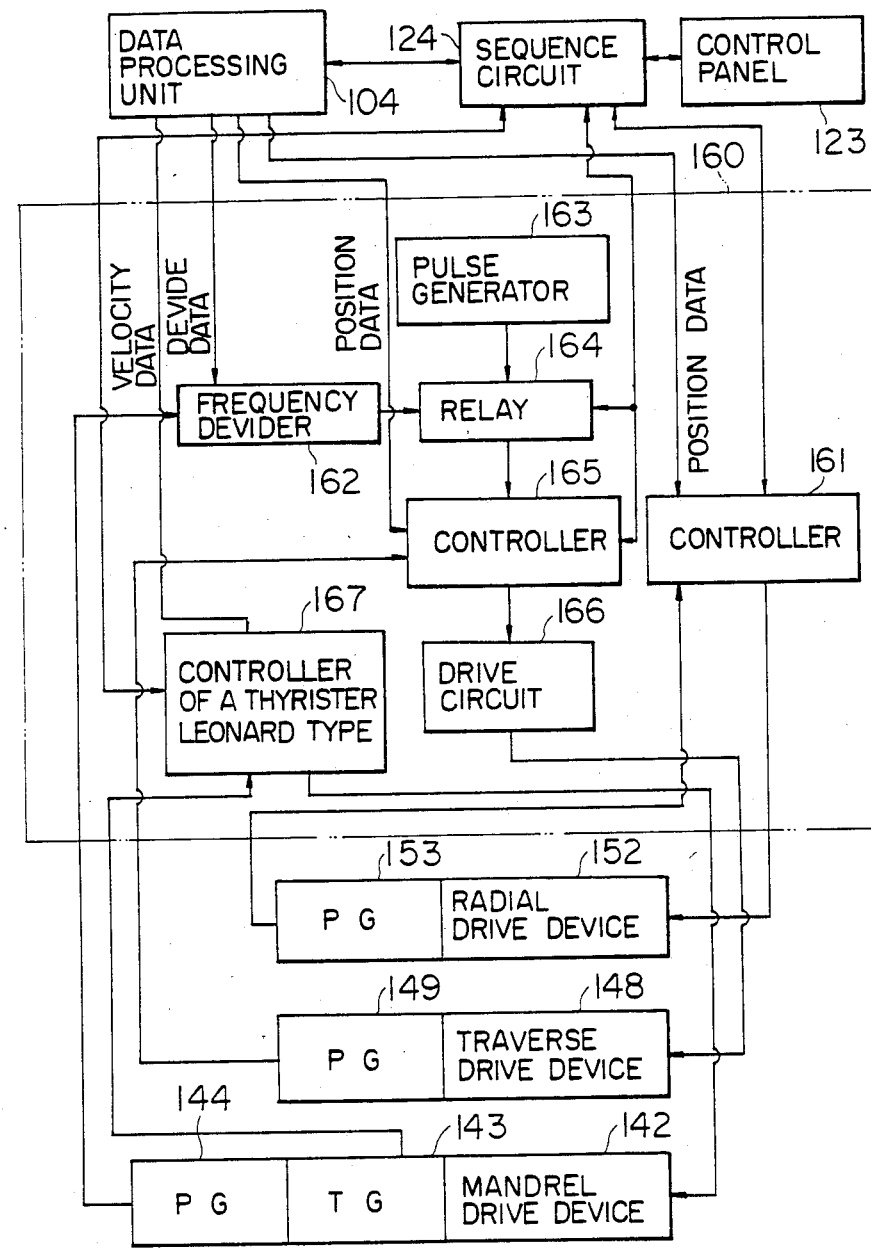
FIG. 11 is a block diagram showing a control unit of the apparatus of FIG. 10.

An embodiment of an improved cord winding device in which the setting condition is varied depending on the type of the V belt padding to be molded will now be described. In FIGS. 10 and 11, a main spindle 106a of a first unit 106 is rotatably supported through a bearing 141 and coupled to a mandrel drive device 142 including a direct current motor, on which a tacho-generator (hereinafter referred to as TG) 143 for detecting the rotational number of the main spindle 106a and a rotary encoder (hereinafter referred to as PG) for detecting an amount of rotation are mounted.

On the other hand, a cord winding device 106e includes a first movable stand 146 which is mounted to a fixed frame 145 slidably in the axial direction of a mandrel 105. A traverse drive device 148 including a direct current servomotor for rotating a feed screw 147 meshed with an internal thread, not shown, fixed in the movable stand 146 is fixedly mounted to the fixed frame 145. The traverse drive device 148 is provided with a PG 149 for detecting an amount of rotation of the feed screw 147, that is, a position of the movable stand 146.

A second movable stand 150 is mounted on the first movable stand 146 slidably in the radial direction of the mandrel 105. A radial drive device 152 including an AC motor with a brake for rotating a feed screw 151 meshed with a internal screw, not shown, fixed to the movable stand 150 is fixedly mounted to the movable stand 146. The drive device 152 is provided with a PG 153 for detecting an amount of rotation of the feed screw 151, that is, a position of the movable stand 150.

A touch pulley 154 urged to be pressed to a cylindrical unvulcanized rubber member 115, 116 on on the mandrel 105 for leading a cord 117 is rotatably mounted on an end of a lever 156 attached to the movable stand 150 through a shaft 155. An top end of a rod of an air cylinder 157 slidably mounted on the movable stand 150 is coupled to the lever 156 through a pin not shown. A guide wheel 158 for guiding the cord 117 is rotatably mounted on the movable stand 150.

While not shown, limit switches for detecting an overstroke of the movable stands 146 and 150 are provided and a plurality of touch pulley devices such as the device 154–158 are provided in an actual appratus.

Figure 3:
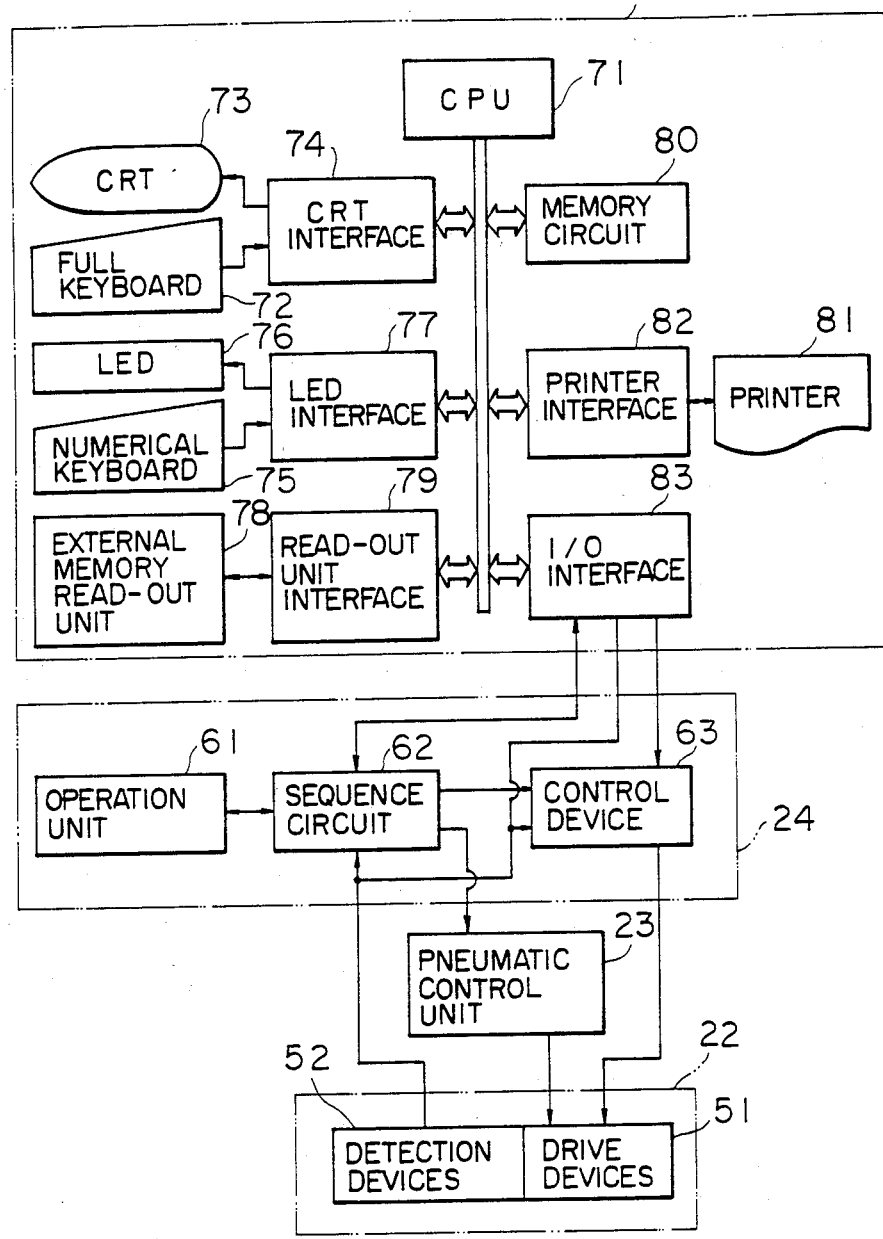
FIG. 3 is a block diagram showing a control unit of the apparatus of FIG. 2.
Figure 4:
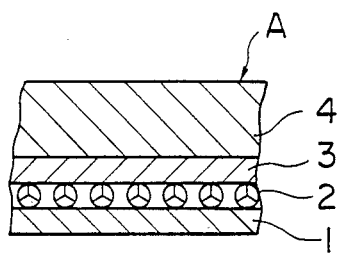
FIG. 4 is a sectional view of a V belt.
Figure 5:
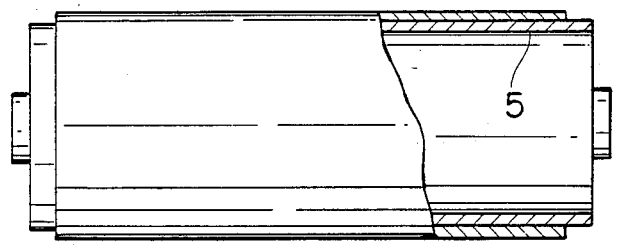
FIGS. 5 to 9 are sectional views of a mandrel in the molding process of the V belt.
Figure 6:
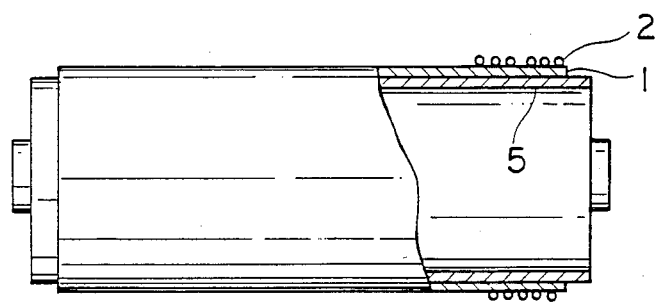
Figure 7:
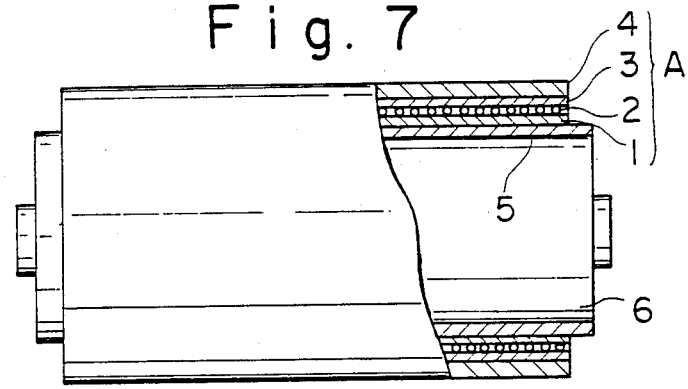

In FIG. 11, reference numeral 123 denotes a control panel including an automatic/manual exchange switch, a start/stop switch and other switches which are disposed separately in the apparatus, a portion enclosed by double-dotted broken line 160 is a portion of the control unit 25 for a drive unit shown in FIG. 3. Reference numeral 161 denotes a controller including a comparison circuit for comparing a position signal generated from a PG 153 and a position setting data signal produced from a data processing unit 104 for controlling an AC motor with a brake in the radial drive unit 152 by a signal from sequence circuit 124, numeral 162 denotes a frequency divider for selecting a cord winding pitch, that is, a frequency divider for converting the number of generated pulses of a PG 144 for the mandrel 105 in accordance with a frequency dividing data outputted from the data processing unit 104, numeral 163 denotes a pulse generator for setting a traverse speed of the touch pulley 154 other than the cord winding time, numeral 164 denotes a relay for selecting an output signal of the frequency divider 162 and an output singal of the pulse generator 163 in response to an output signal of the sequence circuit 124, numeral 165 denotes a controller including a comparison circuit for comparing the position setting data signal from the data processing unit and a position data signal produced from a PG 149 and another comparison circuit for comparing a speed setting data signal produced from the relay 164 and a speed signal (the number of generated pulse per second) generated from the PG 149 for controlling a DC servomotor of a traverse drive unit 148 in accordance with the signal from the sequence circuit 124, numeral 166 denotes a drive circuit for driving the DC servomotor in response to an output signal of the controller 165, and numeral 167 denotes a controller of a thyristor leonard type including a comparison circuit for comparing a speed signal (voltage) produced from a TG 143 and a speed setting data (voltage) produced from the data processing unit 104 for controlling a DC motor of a mandrel drive unit 142 in response to the singal from the sequence circuit 124.

The cord winding operation in the first unit will now be described.

When the mandrel moves to the position P3 of FIG. 2, the first unit 106 begins to move so as to support the mandrel 105 by the tail spindle 106d and the sequence circuit 124 supplys the data request signal to the CPU 71 through the input/output interface 83 of FIG. 3.

At this time, if the second counter memory in the memory circuit 80 is N, the CPU 71 selects a designation data concerning the molding order number N and the specification data stored in the memory circuit 80 and executes the next calculation. The CPU 71 then compares the material number Qn of the used cord 117 in the specification data with the material number of the cord 117 fed to the cord feeding unit 17. The mandrel rotational speed data is given by $$X_1 = a_1 - b_1 Lm$$

The radial position data is given by $$X_2 = a_2 - b_2 Lm$$

The traverse start position data is given by $$Xs = bs(T-1)$$

The traverse termination position data is given by $$X_3 = a_3 + b_3 WZ + Xs$$

The frequency dividing data is given by $$X_4 = a_4 Qp$$

where $a_1-a_4$, $b_1-b_3$ are values previously inputted as the mechanical data and obtained by the following equations.

$$a_1 = k_1 \cdot \frac{n_L L_{mH} - n_H L_{mL}}{L_{mH} - L_{mL}}$$

$$b_1 = k_1 \cdot \frac{n_L - n_H}{L_{mH} - L_{mL}}$$

where $k_1$: coefficient determined by the function of D/A converter, TG 143, DC motor controller 167 which are output interface for mandrel rotational speed data.

$L_{mH}$: maximum peripheral length of V belt which can be molded by the present apparatus.

$L_{mL}$: minimum peripheral length of V belt which can be molded by the present apparatus.

$n_H$: optimum rotation number of motor for mantrel drive device 142 for max. length $L_{mH}$.

$n_L$: optimum rotation number of motor for mantrel drive device 142 for min. length $L_{ml}$.

$$a_2 = k_2(E_1 - e_1), b_2 = \frac{k_2}{\pi}$$

$k_2$: number of pulse trains generated from PG 153 when touch roll 154 moves up and down by unit length.

$E_1$: distance between position P122 (original point in the radial direction) of lower side of movable stand 150 when stand 150 is in waiting position and axis of mandrel 105.

$e_1$: safety distance for keeping movable stand 150 so that lower side (position P123) of stand 150 do not come in contact with cord 117 wound on mandrel 105.

$$a_3=k_3 s_3, b_3=k_3, (X_3=k_3 S), b_{3S}=k_3 s_o$$

$k_3$: number of pulse trains generated from PG 149 when stand 146 moves by unit distance.

$s_o$: pitch of mounting touch pulley 154.

$s_3$: extra winding length at the beginning and termination of wound cord.

$S_1$: distance between start position P120 and termination position P121 of cord 117.

$$a_4=k_3/k_4,$$

$k_4$: number of pulses generated from PG 144 when mandrel 105 makes one rotation.

The CPU 71 supplies the above calculated results to each control units 161, 162, 165 and 167 and the comparison result of the material number of cord 117 to the sequence circuit 124 through the input/output interface 83 of FIG. 3, respectively. If the comparison result of the material number is not identical, an error indication lamp is turned on and the winding operation of the cord is not started. If identical, a predetermined touch pulley 154 traverses to the beginning position P120 of winding cord and the tail spindle 106c supports the mandrel 105 to start winding the cord.

More specifically, the movable stand 150 moves down by $l_1$ and then the air cylinder 157 of the touch pulley device is operated to press the cord 117 to the cylindrical unvulcanized rubber material 116 by means of the touch pulley 154. At this time, the touch pulley 154 is in the position P120.

When the cord is pressed to the rubber material 116, the mandrel 105 begins to rotate at a constant acceleration. Then, the touch pulley 154 begins to traverse correspondingly to the rotation of the mandrel 105 and it is started to wind the cord.

When the touch pulley 154 comes a predetermined distance short of the position P121, the mandrel 105 is slowed down and is stopped when reaching the position P21. Then, the cord 117 is automatically cut and the sequence circuit 124 supplies an end signal to the CPU 71 through input/output interface 83 of FIG. 3. The end signal increments the second counter memory by +1 and the touch pulley 154 begins to return to the waiting position.

When the operator presses another start button after checking the winding condition and the presence of a joint of the cord 117, the transportation unit 13 begins to move each receiving the mandrel 105. When the touch roll 154 reaches the waiting position, that is, when the touch pulley 154 near the tail spindle reaches the position P120, P122 and the ever 156 rises up completely, they are stopped sequentially.

An improved cutting device in which the setting condition is varied depending on types of the V belt to be molded will now be described with reference to FIGS. 12 to 14.

A main spindle 108a of a second unit 108 is rotatably supported by bearings 169 including a DC motor. A TG 170 for detecting the rotational number of the main spindle 108a is mounted on the drive device 169.

On the other hand, a cutter device 108e includes a first movable stand 172 which is mounted on a base 171 slidably in the axial direction. A traverse drive device 174 including a DC servomotor for rotating a feed screw 173 meshed with an internal thread, not shown, fixed in the movable stand 172 is fixedly mounted on the base 171 and a PG 175 for detecting the rotational amount of the feed screw 173 is provided.

A second movable stand 178 is attached to the movable stand 172 slidably in the radial direction of the mandrel 105 and a shaft 177 to which a disc knife 176 is fixedly mounted is rotatably mounted to the second movable stand 178. A radial drive device 180 including a DC servomotor for rotating a feed screw 179 meshed with an internal thread, not shown, fixedly mounted in the movable stand 178 is fixed to the stand 172 and a PG 181 for detecting the rotational amount of the feed screw 179 is attached to the drive device 180.

A bracket 182 to which a stitch roll 183 is rotatably mounted is mounted to the second movable stand 172 slidably in the radial direction. The top end of a rod of an air cylinder 184 fixed to the movable stand 172 is coupled to the bracket 183. While not shown, there are provided a proximity switch for detecting the position of the stitch roll 182 and a limit switch for detecting the overstroke of the movable stands 172 and 178.

Figure 13:
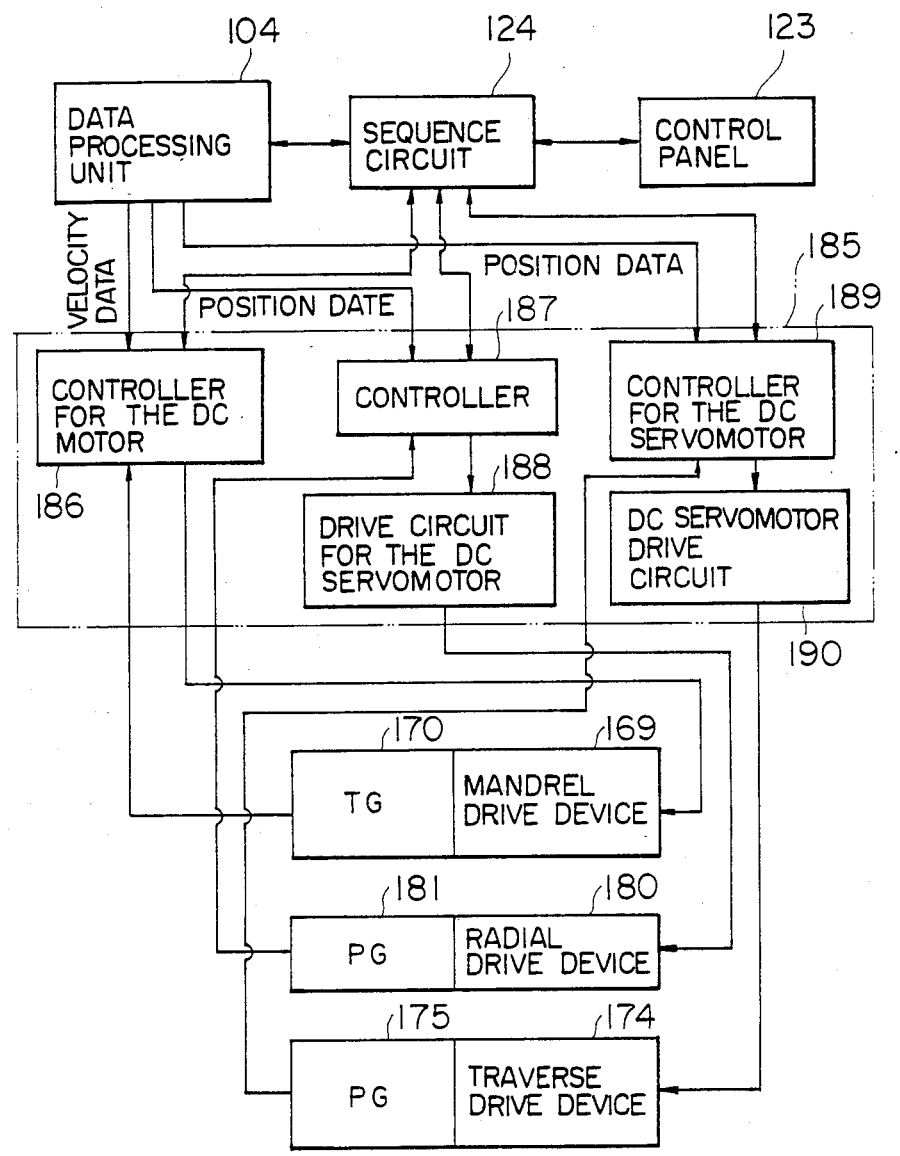
FIG. 13 is a block diagram showing a control unit of the apparatus of FIG. 12.

In FIG. 13, a portion enclosed with double-dotted line is a portion of the drive unit control unit 12 of FIG. 3. Numeral 186 denotes a controller of a thyristor leonard type including a comparison circuit for comparing a rotational speed setting data signal (voltage) of the mandrel 105 produced from the data processing unit 104 and a rotational number data signal (voltage) of the mandrel 105 produced from the TG 170 for controlling a DC motor for mandrel drive unit in accordance with a signal produced from the sequence circuit 124, 187 a controller including a comparison circuit for comparing a position setting data signal produced from the data processing unit 104 and a position data signal produced from the PG 181 for controlling a DC servomotor for the radial drive device 180 in accordance with a signal from the sequence circuit 124, 188 a drive circuit for driving the DC servomotor in accordance with a signal of the controller 187, 189 a controller for a DC servomotor identical with the controller 187, and 190 a DC servomotor drive circuit identical with the drive circuit 188.

Operation of the second unit will now be described.

When the transportation unit 13 moves to the position P5 and the main spindle 108a is inserted into the mandrel 105 completely, the data request signal is supplied to the CPU 71 from the sequence circuit 124 through the input/output interface 83 and the tail spindle 108c begins to move so as to support the mandrel 105. When this operation is finished, the transportation unit 13 releases the mandrel 105 and returns to the position P4.

At this time, when the third counter memory in the memory circuit 80 is N, the CPU 71 selects the designation data of the molding order number N on the basis of the designation data stored in the memory circuit 80 and also selects the specification data corresponding to the designation data from the specification data in the same manner. Then, the CPU 71 performs the following calculations. The rotational speed data of the mandrel is given by $$X_5 = a_5 \text{ (no actual calculation)}$$

The cut start position data in the radial direction is given by $$X_6 = a_6 - b_6 L_s - C_6 d$$

The cut stroke data in the radial direction is given by $$X_7 = X_6 + a_7 + b_7 t$$

The cut start position data in the traverse direction is given by $$X_8 = a_8 \text{ (no actual calculation)}$$

The stitch start position data in the traverse direction is given by $$X_9 = a_9 + b_9 Z W$$

The cut width data in the traverse direction is given by $$X_{10} = b_9 W$$

where $a_5 - a_9$, $b_6 - b_9$ and $C_6$ are values previously inputted as the mechanical data and are obtained as follows. d is a diameter of the disc knife 176 and a value of the diameter actually measured upon exchange of the knife is inputted using the full keyboard.

$$a_5 = k_5 n$$

$k_5$: coefficient determined by the specification of the D/A converter, TG 170 and the controller 186 for DC motor which are interface for the rotational speed data of the mandrel and the reduction ratio of the drive device 169.

n: rotational number (rpm) of the mandrel in the cutting process $$a_6 = k_6(E_2 - \delta_1), b_6 = \frac{k_6}{2\pi}, C_6 = \frac{k_6}{2}$$

$k_6$: number of pulse trains generated by PG 181 while the movable stand 178 moves during unit distance.

$E_2$: gap between top end of disc knife 176 and surface of laminated body 119 at distance between center position P128 of knife 176 and axis of mandrel 105 when movable stand 178 is in waiting position.

$$a_7 = k_6(\delta_1 + \delta_2), b_7 = k_6$$

$\delta_2$: cutting depth for sleeve 115 by disc knife 176

$$a_8 = k_8(A + \delta_3)$$

$k_8$: number of pulse trains generated by PG 175 when movable stand 172 moves unit distance.

A: a distance between centers of disc knife 176 and stitch roller 182

$\delta_3$: corrected distance of cutting start position P125, while $X_6$ is a setting data of stroke $S_2$ from traverse original position P124 (stitch termination position) to cutting start position P125 of disc knife 176.

$$a_9 = k_8 d_3, b_9 = k_8$$

$X_9$ is a data for setting a stroke $S_3$ from the traverse original point P124 of the disc knife 176 to the stitch start position P126, and the stroke $S_4$ until the cut termination position P127 is $S_2 + (Z+1)W$.

A place number Pn containing the material number Qn of the selected unvulcanized rubber sheet 118 and the above calculation, that is, the output position of the unvulcanized rubber sheet of the ply servicer 19 is selected and supplied to the control devices 124, 186, 187 or 188 through the input/output interface 83 together with the numbers $Q_1$ of the wound layers of the unvulcanized rubber sheet and the number Z. The output position of the unvulcanized rubber sheet and the number of wound layers are displayed in the order of use by the indication lamp of the operation and display unit 123, and the disc knife 176 moves to the positions P126 and P128.

Figure 12:
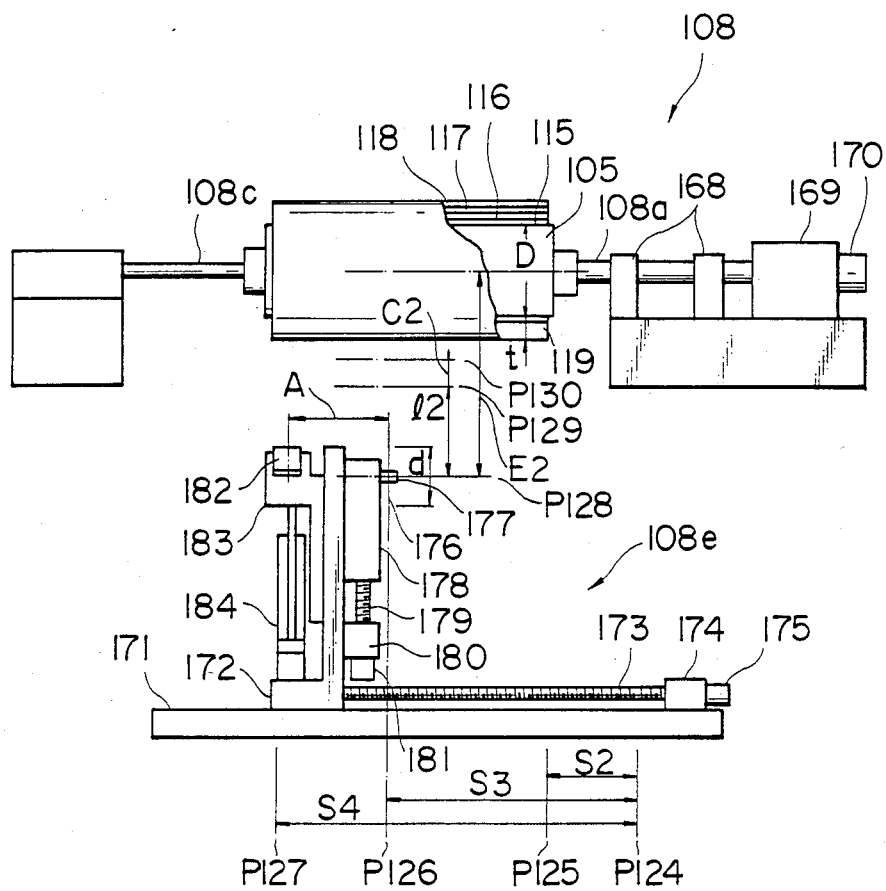
FIG. 12 is a front view schematically illustrating an improvement of a second unit.

In FIG. 12, after the second transportation unit 13 is returned to the position P4, the unvulcanized rubber sheet is wound by cooperation of the mandrel drive unit 169 and a unit (not shown) in the ply servicer 19. The extra rubber sheet is cut and rewound on the ply servicer 19. Then, the mandrel 105 begins to rotate by the set rotation number n and the air cylinder 184 is operated. While the stitch roll 182 presses the unvulcanized rubber sheet 118, the stitch roll 182 begins to moves to the position P124.

When reaching the position P124, the stitch roll 182 is released to be returned to the position P125 and the center of the disc knife 176 is moved to the position P129. When the disc knife 176 reaches the position P125, P129, the operation enters into the cutting process.

In one cycle of the cutting process, the disc knife 176 is first moved to the position P130, stays there during only one rotation of the mandrel 105, and the knife 176 is then returned to the position P129. Then, the knife 176 is moved toward the position P126 from the position P125 by the cut width W. Thus, one cycle of cutting process is terminated and the subsequent cutting process then starts.

Thus, when the cutting process is completed (Z+1) times, the disc knife 176 is moved to the position P127, P128. When the rotation of the mandrel 105 stops, the sequence circuit 124 supplies the end signal to the CPU 71 through the input/output interface 83 and the third counter memory is incremented by +1.

When the disc knife 176 reaches the position P127, P128 and the mandrel is stopped, the transportation unit 14 is moved to the position P5 to receive the mandrel 105. When the transportation unit 14 supports the mandrel 105, the tail spindle 108c is returned to the waiting position. If the third unit 10 is in the state capable of receiving the mandrel 105, the transportation unit 114 supports the mandrel 105, is moved to the position P6 and stopped.

The material feed length detection PG provided in the cord feeding unit 17 and the ply servicer 19 detects the feed length upon feeding of the material, and the detected signal is supplied to the CPU 71 through the input/output interface 83. The CPU 71 supplies a result subtracted from the residual quantity of the material (the supply quantity upon supply of the material) to the LED display unit through the LED interface 77 to display it.

Further, in accordance with the designation data and the specification data, the calculation of $(L_L - S_1 \cdot Lm/Qp)$ for the cord 117 and the calculation of $(L_R - Lm \cdot Q_L)$ for the unvulcanized rubber sheet 118 are successively made to obtain the number of times R satisfying $L_R < 0$, and the value of (R−1) is displayed on the LED display unit through the LED interface 77.

Each time one mandrel has been processed by the second unit 13, the CPU 71 subtracts one from a previously inputted usable times of the disc knife 176 and the subtracted result is displayed in the CRT 73 through the CRT interface 74.

The control of the mandrel in the mandrel rack will now be described in detail.

Figure 14:
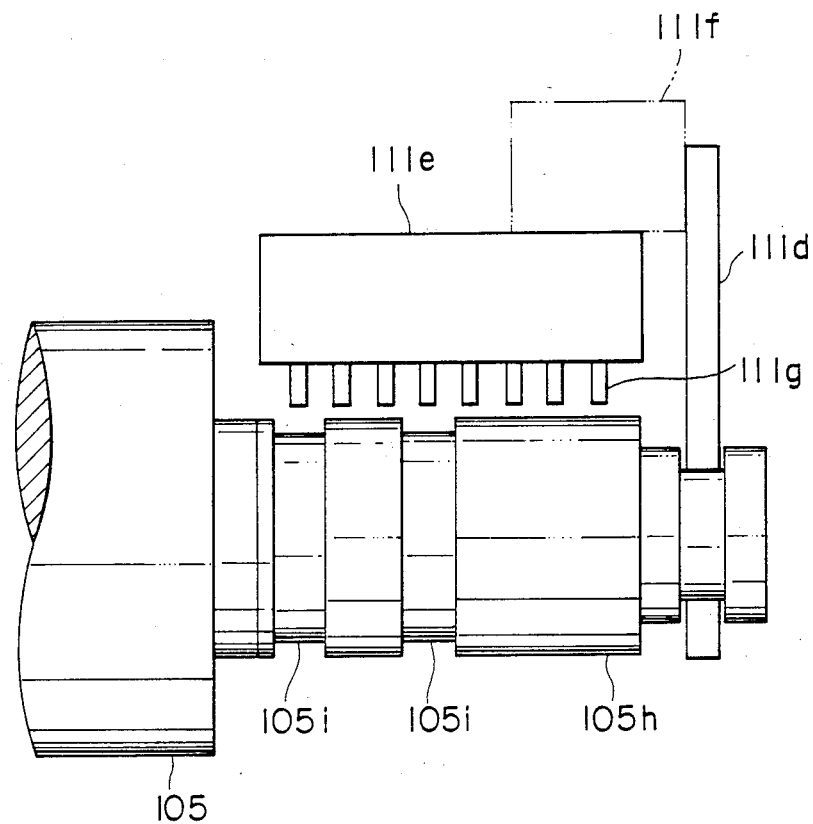
FIG. 14 is a side view of a mandrel reading unit.

Referring to FIG. 14, a grooved ring 105h is inserted on one shaft of the mandrel 105. The ring 105h is fixed by known means so that the ring is not removed from the shaft. On the other hand, a multiple switch 111e is mounted to an up-and-down frame 111f mounting a hook 111d of a mandrel loader When the hood is moved down to a hanging position of the mandrel 105, two of eight sensors 111g included in the multiple switch 111e detects grooves 105i formed in the outer peripheral surface of the ring 105h. The position and the number of the grooves 105i are changed for each mandrel and the mandrel number is given by the binary number.

The DC servomotor for the traverse drive device 148 and the AC motor with brake for the radial drive device 152 in FIG. 10, for example, may be changed to a pulse motor and a portion of the control unit may be varied by changing to the pulse motor.

After the operator takes out the cut V belt padding while inspecting the V belt padding, the operator inserts a cylindrical unvulcanized rubber material to be used next to the mandrel 105. When the insertion of the rubber material is completed and the start push-button is pressed again, the mandrel 105 begins to angularly move from the position P7 of FIG. 2 to the position P6 and the sequence circuit 124 supplies the data request signal to the CPU 71 through the input/output interface 83. At this time, if the counter memory in the memory circuit 80 is N, the mandrel number M of the Nth molding order is selected from the designation data stored in the same manner and an empty position is searched from the position P8 to P14. Thus, the searched number, for example P8, and the mandrel number M are supplied to the sequence circuit 124 through the input/output interface 83.

The condition of the fourth counter memory is considered when six mandrels are used for the continuous molding operation. When the mandrel a which has been used for the molding of the Nth V belt padding is in the third manufacturing, the mandrel b being in use for the (N+1)th molding is in the second unit 18 and the third counter memory is (N+1). The mandrel c being in use for the (N+2)th molding is in the first manufacturing 6 and the second counter memory is (N+2). The mandrel d holding the transportation 12 is to be used for the (N+3)th molding. Since the output from the mandrel rack 15 is already completed, the first counter memory is (N+4).

The mandrel rack 15 keeps two mandrels (for the (N+4)th and (N+5)th) inserted in the cylindrical unvulcanized rubber member and therefore the fourth counter memory is N+6.

When the spindle 16a is angularly moved and the mandrel reaches the position P6, the transportation unit 14 supports the mandrel once and the third unit 16 releases the mandrel. The mandrel loader 15 comes to the position P6 and the grasp device falls to hold the mandrel.

At this time, the number of the mandrel and the mandrel number M produced from the data processing unit are compared. If both numbers are not identical, an error indication lamp is turned on and the operation is stopped. If both numbers are identical, the mandrel is lifted up, transported and moved down to be kept to the position P8. The fourth counter memory is incremented by +1. The support device 14b of the transportation unit 14 is moved down. Thus, one cycle of the molding operation of the V belt padding is completed.

While the molding of the V belt padding having a square section is described in the above embodiment, the present invention is applicable to a molding apparatus using a so-called reverse molding method in which the inside and the outside of the V belt are reversed to mold a padding and outside edges of the padding formed in the molding are cut off in the cutting process so that a V belt having an approximate trapezoidal section is formed and the inside and the outside of the V belt are returned to the original after completion of the molding, by adding a cutter for cutting the edges, a drive device and a control device thereof.

Further, if types of the V belt padding to be molded in a predetermined period is less, the mandrel rack can be omitted from the main unit, and it is convenient that the setting data together with the molding order is inputted as the designation data or the specification data of the V belt padding together with the molding order is inputted as the designation data to calculate the setting data.

The external memory for the designation data may use a punch card, a magnetic card, a cassette tape, a floppy disc or the like depending on associating facilities and operation control. It may also utilize another unit using an on-line system instead of the external memory.

As apparent from the foregoing, the present invention is applicable to the molding of a flat belt padding and is also applicable to a V belt, a flat belt and the like without wrapping in which cutting in round slices in a unvulcanized rubber condition is omitted but cutting in round slices is made after vulcanization is made in a cylindrical condition.

According to such an apparatus, the following effects are exhibited.

(1) The productivity is improved by automatization. More specifically, almost all operations can be automatized except the taking out of the unvulcanized rubber belt and the mounting of the overcord to the sleeve. The operation by handwork of the operator is greatly reduced as compared with the prior art. The molding step is divided into three sections and therefore the cycle time of the molding is reduced to one half to one third of the prior art.

(2) There is no scattering in quality depending on operators. In other words, the automatization of almost all operations eliminates the decision work by the operator, the misuse of the material and the wrong setting of the condition. The accuracy of the winding length and the quality of the belt padding are greatly improved by automatizing the undercord and the ply up cut which are difficult operations in the molding operation.

(3) The production for many types but small quantity can be effectively attained by preparing many mandrels. Since the mandrel can be automatically exchanged, the molding operation is not interrupted due to the exchange operation of the mandrels and the molding operation can be continued.

(4) There is provided the data processing unit, and the setting conditions for each portion can be automatically changed in accordance with the setting data of each portion produced from the data processing unit in response to the previously inputted molding order. Accordingly, a complicated operation can be effectively performed in which one device executes the molding of the belt having the nth specification while another device executes the molding of the (n+1)th belt having a different specification.

(5) Instead of direct input of the setting data of each portion, the data processing unit calculates the setting data on the basis of the specification data of the belt to be molded, resulting in reduction of the input operation.

(6) The specification data of all types of belts to be molded are previously inputted, and only data necessary for reading out the specification data is inputted as the designation data at the beginning of the molding operation. Simplification of the input operation at the beginning of the operation and the improvement of the working ratio can be attained.

(7) By inputting the designation data or the specification data from a magnetic recording medium in which the designation data or the specification data is previously stored, the input time of the data can be shortened and the check of the inputted data and the correction thereof can be eliminated.

(8) By providing a programable controller (sequencer) as a controller of the sequential operation for each unit, the simplification and minimization of the sequential control unit can be attained and the reliability of the control circuit can be improved.

(9) By adding the calculation and display function of the residual quantity of the material for the belt fed to each device, the operator can forecast the feeding timing of the material.

(10) By adding the calculation and display function of the number of mandrels which can be molded by the remaining material, the operator can exactly forecast the feeding timing of the material and the timing required for associating works.

(11) By inputting the permissible operation times of the tools, the residual times thereof can be calculated and displayed, and the tool exchange timing can be previously warned to the operator.

(12) By automatically selecting the mandrels from and into the mandrel rack which can accommodate a plurality of mandrels on the basis of the designation from the data processing unit, types of the usable mandels can be greatly increased.

(13) By providing a reading unit of the mandrel number in the loader of the mandrel rack and confirming the mandrel number upon transportation of the mandrel, wrong operation can be prevented.

What is claimed is:

1. A method of molding a belt for transmitting power including:
    a first step of mounting an unvulcanized rubber sheet on a mandrel;
    a second step of forming a cord layer on the unvulcanized rubber sheet;
    a third step of winding an unvulcanized rubber sheet on the cord layer to form a laminated body; and
    a fourth step of cutting the laminated body to a predetermined shape;
    said method characterized in that:
    said first step comprises a step of mounting unvulcanized rubber sheets on a plurality of mandrels and preserving the mandrels;
    said second step comprises a first transportation step of moving the mandrel to a place in which said second step is carried out after said first step, said first transportation step comprises a step of selecting a necessary mandrel of said plurality of mandrels;
    said third step comprises a second transportation step of moving the mandrel to a place in which said third step is carried out after said second step; and
    said fourth step comprises a third transportation step of moving the mandrel to a place in which said first step is carried out;
    wherein the mandrel is transported using a transportation unit which runs on rails in said first to third transportation steps; designation data for belts of different types is supplied to units in each step and the belts of different types are manufactured at the same time in parallel.

2. A method according to claim 1, wherein said first to third steps and said first to third transportation steps are controlled by a controller including means for inputting data necessary for molding the belt, detection means for detecting operation of each portion of units, drive means for driving each portion of units, means for outputting various information and a central control unit CPU.

* * * * *